United States Patent [19]

Sundar

[11] Patent Number: 4,931,161
[45] Date of Patent: Jun. 5, 1990

[54] CLEANUP OF OILY WASTES

[75] Inventor: Parameshwaran S. Sundar, Fairfax, Calif.

[73] Assignee: Chevron Research Company, San Francisco, Calif.

[21] Appl. No.: 379,408

[22] Filed: Jul. 12, 1989

[51] Int. Cl.$^5$ .............................................. C10G 17/10
[52] U.S. Cl. ..................................... 208/13; 208/182; 208/181; 208/299
[58] Field of Search ................. 208/13, 177, 181, 182, 208/283, 299, 302, 310 R; 210/908

[56] References Cited

U.S. PATENT DOCUMENTS 4,514,307  4/1985  Chesnut et al. ................ 210/908 X
4,775,457  10/1988  Beer et al. ............................ 208/13

Primary Examiner—Glenn Caldarola
Assistant Examiner—William C. Diemler
Attorney, Agent, or Firm—T. G. De Jonghe

[57] ABSTRACT

A process is disclosed for removing hydrocarbons from oily wastes. According to the process, the oily wastes are mixed with solids and a binder and then granulated. The granules thus formed are contacted with solvent to extract hydrocarbons from the granules. Preferred solids include limestone and preferred binders include portland cement calcium sulfate and/or calcium sulfate hydrate such as plaster of Paris.

13 Claims, No Drawings

CLEANUP OF OILY WASTES

Field of the Invention

The present invention relates to a process for removing hydrocarbons from oily wastes. Examples of oily wastes include oil refinery sludges. Refinery sludges typically contain crude oil, or various other hydrocarbons, particularly heavy hydrocarbons, water and insoluble organic and inorganic fine solids.

Background and Description of Related Art

Treatment of oily waste material, particularly disposal of such waste material, has been a continuing problem. Various methods have been proposed, and in some instances used, for the disposal of oily wastes.

One method is to convert the oily waste material to a substantially impermeable, load-bearing construction material. U.S. Pat. No. 4,515,307 provides an example of such a method. According to the '307 patent, waste material is combined with cementitious reactants consisting essentially of lime and fly ash, in the presence of water, to form a mixture in which the relative proportions of the waste material, lime, fly ash, and water are adapted to permit the lime and fly ash to react at atmospheric conditions and thus to form a cementitious matrix in which the waste material is encapsulated.

Still another method of treating oily wastes involves combining the waste with solids and then incinerating the mixture. U.S. Pat. No. 4,775,457 provides an example of such a method. According to the '457 patent crude oil and other heavy hydrocarbon sludges are mixed with adsorbent material, preferably an earth material, such as diatomaceous earth or or perlite, and oxidized in an incinerator or calciner to produce gaseous combustion products and a friable solids material which is substantially hydrocarbon free and may be recycled for mixture with the incoming sludge stream or otherwise disposed of in an environmentally acceptable manner.

Still another method is to extract hydrocarbons from the oily waste using a solvent. Solvent extraction methods have generally directly combined an extraction solvent with the waste and have not entailed solids addition to the waste, granulation and then solvent extraction.

SUMMARY OF THE INVENTION

According to the present invention, a process is provided for separating hydrocarbons from oily waste or sludge. The process comprises:
   a. adding solids to the oily waste to obtain an oily waste-solids mix,
   b. granulating the oily waste-solids mix to obtain granules,
   c. contacting the granules with a solvent to obtain a solvent-granules mix, and
   d. separating a solvent-hydrocarbon phase and a solids phase from the solvent-granules mix.

In the present invention it is important to include a step wherein the oily waste material is put into a form suitable for granulation and is granulated, and also a subsequent step where the granulated material is subject to solvent extraction. We have found that the granulation step is more advantageously effected when solids, which may be referred to as a filler, are combined with the oily waste prior to granulation. Further, we have found that it is advantageous to add a binder to the waste-solids mix to assist in holding or binding the mix together.

Among other factors, the present invention is based on our findings that through combining the foregoing steps, including solids addition, granulation and solvent extraction, a highly effective oily waste treatment process is achieved. We found that through combining these steps we achieved a surprisingly low amount of residual hydrocarbons in the product solids. The product solids are the solids obtained by separating the solvent-hydrocarbon phase from the solvent-granules mix.

In the present invention, three solids can be referred to: (i) the solids present in the oily waste or oily sludge which is to be treated in the process of the present invention, which can be referred to as feed solids; (ii) the solids which are added to the oily waste, which can be referred to as filler or as added solids; and (iii) the solids which are obtained after the solvent extraction step, which can be referred to as product solids.

Prior to adding solids or filler to the oily waste in accordance with step (a) of the present invention, we have found it often is advantageous to "dewater" the waste. The "dewatering" step involves reducing the amount of free liquid phase in the waste, and may involve a solid-liquid separation operation such as filtration or centrifugation. Free liquid phase refers to any free water and hydrocarbon, as opposed to absorbed or occluded water and hydrocarbons. Preferably, the dewatering is carried out to an extent effective to reduce the free liquid in the waste to about five weight percent or less of the resulting oily waste. Such waste may conveniently be referred to as dewatered waste, but it should be understood that some wastes will be initially available with an amount or type of liquid phase such that a dewatering step is not required or desired.

Preferred amounts of added solids or filler added to the oily waste in step (a), on a dewatered waste basis are from 0.1 to 10 parts added solids per one part waste, more preferably from 0.3 to 3.0 parts solids per one part waste, and most preferably 0.5 to 1.5 parts solids per part waste. We have achieved especially good results in our separation process when using about one part added solids per one part dewatered waste.

Preferred added solids or filler are those effective to assist in converting the oily waste to a more readily granulated material. Thus the type of added solids will vary depending on the waste material to be processed.

A wide variety of added solids can be used, including fly ash, catalyst fines, etc. Preferably, the added solids are an inert or substantially inert absorbent material.

Limestone is a particularly preferred added solids material or filler material.

Also a wide variety of binder or cement type materials can be used. The preferred binder is effective in holding the solids-oily waste mix together that granules can be readily formed and so that the granules will have bodily integrity or cohesiveness. One preferred binder we have found especially effective in our process is portland cement. Another preferred binder is plaster of Paris, i.e., anhydrous calcium sulfate and hydrated calcium sulfate or mixture thereof.

Preferred amounts of binder are 1 to 100 parts binder per 100 parts added solids; more preferably 5 to 40 parts binder per 100 parts solids; and most preferably 10 to 20 parts binder per 100 parts solids. All parts and percentages are by weight herein unless otherwise stated.

Preferred granule sizes from the step (b) granulating are between 0.005 and 0.25 inches. We have found preferred granule or particle sizes for feeding to the solvent extraction step (c) are between 0.05 and 3 inches; more preferably between 0.003 and 0.125 inches; and most preferably between 0.003 and 0.025 inches. These sizes are for the greatest dimension, that is, the diameter, if substantially spherical granules or particles are formed or the length, if substantially cylindrical granules or particles are formed. Granulating followed by grinding can advantageously be used to obtain the preferred size particles for feeding to the solvent extraction step Preferred solvents for use in the present process are hydrocarbon solvents as typically generated in oil refinery operations, preferably having a normal boiling point range between about 70° and 850° F.; more preferably between about 180° and 650° F.; and most preferably between about 275° and 550° F.

According to a preferred embodiment of the present invention, the granules generated in step (b) are contacted with a hydrocarbon solvent in a counter current flow arrangement. Preferably, the countercurrent flow arrangement is conducted in one, or more stages, which may be separate contacting vessels.

According to a preferred overall embodiment of the present invention, a process is provided for removing hydrocarbons from oily waste, which comprises:

a. removing free liquids from the oily waste, for example free water or free hydrocarbons. This step is not critical and can be omitted, particularly where it is more economical to remove the undesired organic components from the free liquids in the subsequent solvent extraction step.

b. combining oily waste from step (a), if step (a) is included, with solids and a binder to form an oily-waste-solids mixture;

c. granulating the oily-waste-solid mixture to obtain granules;

d. curing and drying the granules;

e. reducing the size of the granules to small particles less than 0.1 inch in size;

f. contacting the small particles with a solvent effective to extract hydrocarbons; and g. separating the solvent containing extracted hydrocarbons from the small particles.

DETAILED DESCRIPTION OF THE INVENTION

As previously discussed, the present process treats waste which contains hydrocarbons. These wastes typically contain a hydrocarbon, a solid, and generally also water.

Specific examples of hydrocarbon wastes are API separator sludge, oily dirt, tank bottoms, reservoir sludges, API filter cakes, sludge from oily dumps, etc. The hydrocarbons found in this waste can be viscous or nonviscous and include a wide range of cyclic and noncyclic hydrocarbons. Typically the hydrocarbons have a relatively high molecular weight which causes them to be viscous. These higher molecular weight "hydrocarbons" may contain heterocyclic compounds having nitrogen or sulfur atoms, but are lossely referred to as hydrocarbons as they are primarily composed of hydrogen and carbon atoms. Typically, the hydrocarbon fraction of the waste comprises between 2 and 50% of the total waste, more typically between 2 and 20% of the total waste.

The oily waste may contain solids of different sizes. The solids may be from 0.001 inch to 4.0 inch in size. Solids which are between 0.001 and 0.0625 inches are typically called "fines". Solids which are between 0.0625 and 4.0 are easier to separate out by screening. Typically, the solids may comprise between 2 and 85% of the waste, more typically, between 35 and 85% of the waste.

As described above, the wastes are treated by forming them into solid granules and then extracting the hydrocarbons. The granules preferably are formed by adding solids, which may be called a filler, to increase the solids content of the waste and, preferably, also adding a binder to assist in holding the mix together. It is believed that the addition of solids helps trap fine particles that are otherwise difficult to separate from the solvent extract. Then granulated separation may be carried out readily by filtration.

Added solids or fillers used in the present invention increase the solids content of the waste and, preferably, assist in rendering the resulting mass amenable to granulation. Preferably, the fillers are inert. Examples of fillers are: fly ash; limestone; spent catalysts and catalyst fines; calcium sulfate dehydrate; gypsum; calcium carbonate; woodchips or sawdust; sodium silicate; magnesium carbonate; as well as other silicates and carbonates, etc. Preferably, enough filler is added to increase the solids content to between 65% and 95% of the total mixture, more preferably between 75% and 90% of the total.

Binders used in the present invention preferably are materials which form an interlocked mass with the added solids or filler, that can be granulated. To form this mass, it may be necessary to provide water to the binder. The water can be added or present in the waste. Typical binders are cementitious materials such as lime, portland cement, calcium aluminate, plaster of Paris, gypsum, etc. The term, "portland cement", is used to refer to a cementitious material obtained by roasting a mixture of lime and clay and the pulverizing resulting material. Thus it typically is a greenish gray powder of basic calcium silicate, calcium aluminate, and calcium ferrites. When mixed with water it solidifies to an artificial rock, similar to portland stone.

Filler and binder can be mixed with the waste in any sequence to obtain a good mixture. For example, the binder and filler may be preblended before being mixed with the waste or each may be individually mixed with the waste. The types of mixing apparatus which may be used include ribbon blenders, vertical mixers, concrete mixers, or other similar types of mixing equipment or processes which are sufficient to cause intimate contact between the waste, the filler and the binder. The amount of each material and the amount of time required for mixing is adjusted to obtain a substantially homogeneous mixture capable of being formed into discrete particles, preferably by granulation.

Water may be added to the filler/binder/waste mixture to assist in solidification, however, the waste may already contain sufficient water.

After the components have been mixed, and preferably granulated, excess water preferably is removed from the granules. This may be accomplished using heat over time. The dried granules may be ground to smaller size in roll mills or the like.

After formation of the granules or ground granules, entrapped hydrocarbons are removed by extraction with solvent. The solvents useful in this extraction depend on the nature of the entrapped hydrocarbon. The solvent must be effective to dissolve the hydrocarbon. Preferable solvents include petroleum derived hydrocarbons, chlorinated solvents, tetrahydrofuran, methylethyl ketone, methyl isobutyl ketone, etc. Preferred petroleum derived hydrocarbons are fraction or distillates having a boiling range between 70° and 850° F.; more preferably between 180° and 650° F.; and most preferably between 275° and 550° F.

The granules are contacted with the solvent to achieve substantial removal of hydrocarbons. Typically the granules to solvent ratio is between 0.1 and 10.0, more preferably between 1.0 and 3.0. The number of contacts should be sufficient and of long enough duration to remove substantially all of the hydrocarbon, more preferably at least 95% of the hydrocarbon from the granular mass, most preferably, at least 99%. Contact may be made in a vessel which allows agitation. Typical contact times are between one and 100 minutes more typically between two and thirty minutes. One preferred method is to contact the granular mass with the solvent in a multistage countercurrent flow in which the granular mass travels in one direction and the solvent travels in another. After solvent extraction of the granular mass, the solvent may be separated from the hydrocarbon and recycled or it may be used directly in a refining process such as feed to a crude unit.

A mixture of solvents may be used to enhance the extract of the hydrocarbons. An advantageous cosolvent will improve the solubility of the oil (in the granulated waste) in the primary solvent. Specific examples of a cosolvent are: cresylic acid, tetrahydrofuran, and methyl isobutyl ketone.

After the solvent or mixture of solvents is removed, for example by filtration, some solvent may still remain in the granules. The extracted granules may be heated or dried to remove residual solvents. The solvents that are removed during this step, may be recaptured and recycled or disposed in the same fashion as the bulk of the solvents. After solvent removal, the solids may be reused in the process or disposed of in an environmentally acceptable manner.

According to a preferred embodiment of the present invention, a process is provided for cleaning oily soils. In this embodiment, a first step comprises contacting contaminated soil with a solvent to unconsolidate the soil into a grainy mass. The solvent/soil mixture is then screened to give a coarse fraction and a fines fraction containing the solvent-oil phase. The fines fraction is subjected to further processing using the granulation and extraction procedure of the present invention as described above. The process may be subdivided into the following subsections, which for convenience of assembly can be divided into individual skids:
a. Soils handling and Coarse Extraction
b. Dewatering and granulation
c. Fines extraction
d. Solids drying and solvent recovery, and
e. Feed storage and utilities.

EXAMPLE 1

Three-stage countercurrent extractions using granulated feed were completed for three petroleum sludge samples:
a. API separator sludge #1
b. API separator sludge #2
c. API separator sludge #3

The sludges were first centrifuged at 4500 G for 10 minutes to remove excess oil and water prior to granulation.

The granulation procedure consisted of adding the sludge to a 10:1 premix of limestone and portland cement in a kitchen orbital mixer ("Kitchenaid" mixer manufactured by Hobart Machine Co.). Approximately 500 g of the limestone-cement mixture was used for each batch. The addition of sludge was made in small amounts till the mixture started to ball away from the walls of the mixing bowl. This mix was then extruded into approximately ⅛-in. diameter extrudate and allowed to dry at room temperature over the weekend. The dried material was then ground to −32 mesh for extraction.

The compositions of the sludges received and of the dry granulated feed are summarized in Table 1. The amounts of limestone and cement used, along with the yield of dry feed per 100 parts of the sludge centrifuge cake are summarized in Table 2. The solvent used for extraction was a refinery petroleum fraction having a boiling range of 275°–550° F. and containing 12–20% aromatics.

The three-stage countercurrent extraction was simulated in batch contact fashion at room temperature. Extraction was carried out using a slurry solids content of 20 wt. % in the mixers, and an overall solvent to dry feed ratio of 1.2. Separation of the solid and the solvent after mixing was accomplished by vacuum filtration in a Buchner funnel. The extract transferred between stages was used to wash the incoming cake to minimize liquid backmixing from carryover of the entrained liquid in the cake. Each batch addition of feed was about 100 g, and the total inventory of granulated slurry in each stage was approximately 500 g. In order to establish steady state conditions, the test period was selected only after the first 25 batch contacts.

A steady state test period of at least 4 contacts was selected based on overall material balance. The extracts and the clean tailings were composited over this test period for analyses. Also, samples of both the solid and the liquid phases were collected to obtain a concentration profile of the contaminant oil across the 3 extraction stages, in the cake and the extract.

A sample of the composite tailing was then dried at 250° F. for 16 hours followed by 500° F. for two hours. The dried sample was then analyzed for the residual solvent and oil contents. The residual solvent and oil concentrations in the cleaned and dried solids are summarized in Table 3.

TABLE 1

| | Feed Sludge, Centrifuged Cake, and the Dried Granulate Compositions | | | |
|---|---|---|---|---|
| No. | Description | Solids wt. % | Water wt. % | Organics wt. % |
| 1. | API Sludge #1 | 27.9 | 62.9 | 7.7 |
| | Centrifuge Cake | 81.7 | 15.6 | 2.7 |
| | Dried Granulate | 95.0 | 1.1 | 2.9 |
| 2. | API Sludge #2 | — | — | — |
| | Centrifuge Cake | — | — | — |
| | Dried Granulate | 89.3 | 1.1 | 8.9 |
| 3. | API Sludge #3 | 49.8 | 45.0 | 5.5 |

TABLE 2

Dried Granulate Yields
All values expressed based on 100 parts of feed sludge to granulation.

| No. | Feed Description | Feed | Limestone | Cement | Yield |
|---|---|---|---|---|---|
| 1. | API Sludge #1 Centrifuge Cake | 100 | 64.6 | 6.5 | 115 |
| 2. | API Sludge #2 Centrifuge Cake | 100 | 92.3 | 9.2 | 133 |
| 3. | API Sludge #3, as received | 100 | 150.5 | 15.0 | 197 |

TABLE 3

Residual Organics in Cleaned and Dried Solids

| No. | Description | Residual Organics wt. % | Notes |
|---|---|---|---|
| 1. | API Sludge #1 | 0.16 | CC |
| 2. | API Sludge #2 | 0.41 | CC |
| 3. | API Sludge #3 | 0.10 | XC |

XC - three-stage cross-current extraction experiments
CC - three-stage counter-current extraction experiments

EXAMPLE 2

Comparison of Sludge Extraction Methods

A comparative study of various sludge extraction procedures was performed. The study compared extraction procedures using a refinery cut, as a solvent.
The treatments methods compared were:
(a) Extraction of dewatered sludge
(b) Granulation and extraction of dewatered sludge using one part limestone per one part of dewatered sludge
(c) Granulation and extraction of dewatered sludge using two parts limestone per one part of dewatered sludge.

The tests involved two stages of extraction with a 3:1 ratio of solvent to original dewatered sludge feed (feed prior to pretreatment). The residual solids were filtered after each extraction stage and sampled for analysis. Filtration rate and oil content of the residual solids from each contacting were measured. The solids were vacuum oven-dried prior to a modified Oven Drying Technique (MODT) analysis. This MODT method of analysis for light oil, heavy oil and water contents of a solid sample is described below. The heavy oil was the key oil value tracked as the light oil present was believed to be a result of incomplete drying and not an indication of extraction performance.

Methods (b) and (c) were found to result in improved oil removals compared to method (a). This is illustrated in Tables 5 and 6, which show much lower residual oil for methods (b) and (c), than for method (a).

TABLE 4

Oil, Water, and Solids Analysis

| Extraction Method | Lt. Oil (wt. %) | Hv. Oil (wt. %) | Water (wt. %) | Solids (wt. %) | Filtration Time (min) | Notes |
|---|---|---|---|---|---|---|
| | 1.92 | 11.82 | 41.74 | 44.52 | (1) | Feed |
| First Stage Extraction | | | | | | |
| a. | 0.62 | 5.53 | 2.23 | 91.49 | 360 | |
| b. | 0.45 | 1.59 | 0.80 | 97.16 | 169 | (2) |
| c. | 0.09 | 0.68 | 0.68 | 98.55 | 2.4 | (3) |
| Second Stage Extraction | | | | | | |
| a. | 6.96 | 3.46 | 6.53 | 83.04 | 20 | |
| b. | 2.2 | 1.08 | 1.04 | 95.68 | 7.2 | (2) |
| c. | 1.63 | 0.54 | 0.88 | 96.95 | 2.2 | (3) |

(1) Would not filter
(2) In the granulation step, one part limestone was used per one part sludge
(3) In the granulation stage, two parts limestone was used per one part sludge

TABLE 5

Results from Example 2

| Extraction Method | Filtration Rate, gal/min-ft$^2$ | | 1st Stage Residual Oil, Wt. % of Dry Solids | 1st Stage Oil Removal, % Feed Oil Removed |
|---|---|---|---|---|
| | 1st Stage | 2nd Stage | | |
| a. | 0.004 | 0.04 | 6.0 | 77 |
| b. | 0.009 | 0.11 | 1.7 | 94 |
| c | 0.330 | 0.36 | 0.7 | 97 |

Wt. % of dry solids in the feed sludge was 26.5.

Analysis via Modified Oven Drying Technique (MODT)

The MODT procedure was used to analyze the results in some of the experiments. This procedure determines the amount of light hydrocarbons, oil, water, and solids in oily waste. Light hydrocarbons are all hydrocarbons which volatilize when heated to 230°–240° F. for 2–4 hours. "Oil" is defined as those hydrocarbons which are soluble in dichloromethane and do not dissolve in water. "Solid" is defined as material which does not decompose at 250°–300° F. and is not soluble in dichloromethane.

The MODT is a two-stage procedure. In the first stages light hydrocarbons and water are separated from heavy oils and solids by heating in vacuum and by the use of nitrogen as stripper gas. Light hydrocarbons and water are recovered in cold traps and subsequently separated by freezing out the water phase. In the second stage, heavy oils are separated from the solids by Soxhlet extraction with dichloromethane.

EXAMPLE 3

API separator sludge containing approximately 10 wt. % of oil on a dry basis was granulated using 100 parts limestone, and 20 parts Portland cement per 100 parts sludge. The granules were cured overnight at 40° C. and crushed to 30 to 32 mesh size. The crushed granules were then leached in three countercurrent stages with a hydrocarbon solvent (refinery cut) boiling approximately in the range of 275° F. to 550° F. The solvent to feed ratio was 1.0. The leached material was dried overnight at 250° F., and then at 500° F. for two hours. The dried material contained only 0.15 wt. % organics (residual oil) on a dry basis.

What is claimed is:
1. A process for separating hydrocarbons from oily waste, which comprises:
   a. adding solids to the oily waste to obtain an oily waste-solids mix,
   b. granulating the oily waste-solids mix to obtain granules,
   c. contacting the granules with a solvent to obtain a solvent-granules mix, and
   d. separating a solvent-hydrocarbon phase and a solids phase from the solvent-granules mix.

2. A process in accordance with claim 1 wherein a binder is added to the waste-solids mix obtained in step a to thereby assist in holding the mix together.

3. A process in accordance with claim 2 wherein the ratio of added solids to binder is between 100:5 and 100:40.

4. A process in accordance with claim 3 wherein the ratio of added solids to binder is between about 10:1 and 5:1.

5. A process in accordance with claim 2 wherein the added solids comprise an inert absorbent material.

6. A process in accordance with claim 5 wherein the added solids comprise limestone.

7. A process in accordance with claim 2 wherein the binder comprises portland cement.

8. A process in accordance with claim 1 wherein step (b) comprises granulating or crushing the oily waste-solids mix into granules or particles less than 0.025 inch prior to solvent extraction in step c.

9. A process in accordance with claim 1 wherein the solvent comprises a petroleum distillate in the range 275° to 550° F.

10. A process as recited in claim 1 wherein the granules from step (b) are contacted with a hydrocarbon solvent in countercurrent flow.

11. A process for separating hydrocarbons from an oily waste, comprising:
  a. removing free liquids from the oily waste;
  b. combining oily waste from step (a) with solids and a binder to form an oily-waste-solids mixture;
  c. granulating the oily-waste-solids mixture to obtain granules;
  d. curing and drying the granules;
  e. reducing the size of the granules to small particles less than 0.1 inch in size;
  f. contacting the small particles with a solvent effective to extract hydrocarbons; and
  g. separating the solvent containing extracted hydrocarbons from the small particles.

12. A process in accordance with claim 11 wherein the added solids comprise limestone.

13. A process as recited in claim 11 wherein the binder is portland cement.

* * * * *